Jan. 3, 1967     G. A. HAAS     3,296,523
APPARATUS FOR MEASURING CHARACTERISTICS OF MATERIALS
THROUGH THE APPLICATION OF PULSES OF SUCCESSIVELY
INCREASING AMPLITUDE
Original Filed Aug. 29, 1960
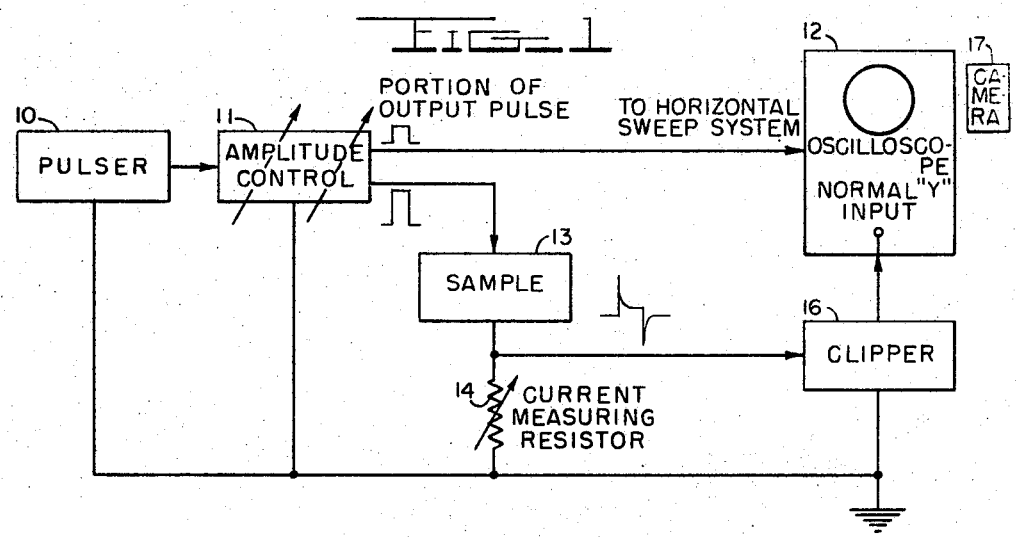
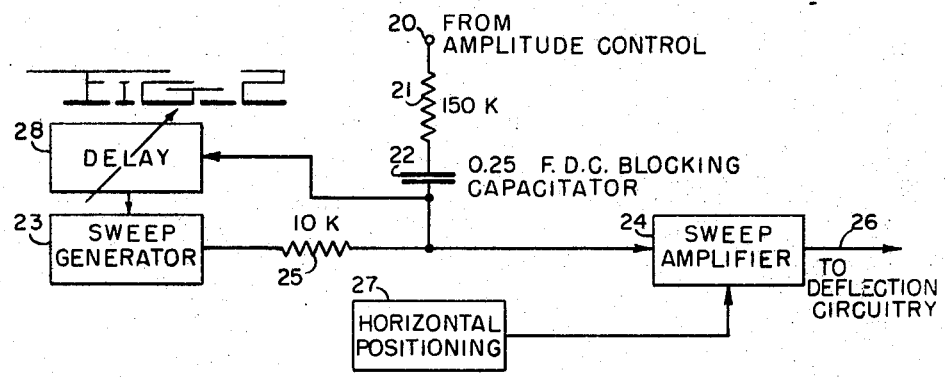
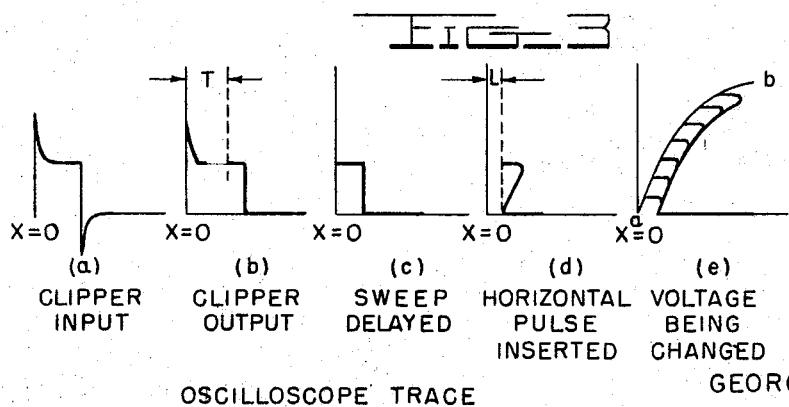
INVENTOR
GEORGE A. HAAS
BY
ATTORNEY 3,296,523
APPARATUS FOR MEASURING CHARACTERISTICS OF MATERIALS THROUGH THE APPLICATION OF PULSES OF SUCCESSIVELY INCREASING AMPLITUDE
George A. Haas, 5 Fort Hill Drive,
Alexandria, Va. 22310
Continuation of application Ser. No. 52,745, Aug. 29, 1960. This application July 17, 1963, Ser. No. 296,422
2 Claims. (Cl. 324—57)

The invention described herein may be manufactured and used by or for the Government of the United States of America for governmental purposes without the payment of any royalties thereon or therefor.

This application is a continuation of application Serial No. 52,745, now abandoned, filed August 29, 1960.

This invention relates to apparatus for measuring electrical characteristics of materials to study short term equilibrium conditions and yet avoid long term changes in the materials.

In the measurement of characteristics of materials it is customary to determine the behavior of such a material when forces of different amplitudes are applied. Although such measurements are in no way so limited, a typical application of such measurement is in the determination of the resistance characteristics of an electrical component such as an electron tube, a transistor, a conductive solution, or many other forms. In such devices it is desired to obtain the characteristics over the range of concern in as short a time as possible to minimize the effect of long term variables, however it is essential that the measurements be taken at equilibrium conditions even though they may persist for a short time. When measurements are taken in other ways than the combination of short term equilibrium conditions with avoidance of long term changes, various undesirable effects are noted such as overheating of the sample, donor migration, polarization effects, electrolysis effects and various other thermal, electrical, mechanical and chemical changes in the sample.

In the general, the prior art contains two methods of making measurements such as the foregoing, however these do not possess the desired characterization of short term equilibrium and avoidance of long term changes. A first method employed is one in which a voltage pulse is applied to a sample (semiconductor, thermionic diode, electrolytic solution, etc.) and then the pulse voltage and pulse current are carefully measured on separate oscilloscopes. In this method the major difficulty is the lengthy time necessary to measure the sample as determined by the time required to obtain accurate current and voltage readings on separate oscilloscopes multiplied by the number of such readings desired. This often is long enough to allow changes to occur in the sample such as drift in temperature, activity, and so forth. Another objection is that if the pulse is not perfectly flat, an error might arise from reading the voltage and current at slightly different points along the pulse.

A second method of measuring such voltage-current characteristics is to apply a sawtooth voltage to the sample and present a plot of current as a function of voltage on one oscilloscope. This method overcomes some of the foregoing difficulties stated in connection with the first prior art method of excessive measuring time since it plots current as a function of voltage directly which can then be photographed. However, inherent in this technique is the disadvantage that the voltage across the sample is constantly changing. Therefore, the accuracy is limited by the superposition of a displacement current on the regular current to be measured. This displacement current is given by $$I_{(\mathrm{amp})} = C \frac{dv}{dt}$$

where C is the capacity of the sample in farads and $dv/dt$ is the slope of the applied sawtooth in volts per second. It can be seen that this problem becomes more pronounced at higher values of C and for shorter duration of the sawtooth wave form (higher $dv/dt$). Another difficulty brought about by this method is that the system under measurement is not in equilibrium and therefore problems requiring short term equilibrium conditions (e.g., effect of carrier diffusion or recombination, emission decay, etc.) cannot be easily undertaken. The technique to be described eliminates these difficulties and is capable of giving pulsed voltage-current characteristics in a matter of a few seconds that can be measured with an accuracy of the order of tenths of one percent.

It is accordingly an object of the present invention to provide apparatus for measuring characteristics of materials wtih a high degree of accuracy.

Other and further objects and many of the attendent advantages of this invention will be readily appreciated as the same becomes better understood by reference to the following detailed description when considered in connection with the accompanying drawings wherein:

FIGURE 1 shows a typical combination of apparatus in accordance with the teachings of the present invention.

FIGURE 2 shows in greater detail a typical signal input circuit for the apparatus of FIGURE 1.

FIGURE 3 shows various wave forms present in the apparatus of FIGURE 1 under various conditions.

In accordance with the basic teachings of the present invention, a method of measuring characteristics of materials is provided wherein rectangular pulses of energy are employed and applied across a sample under test, measurement being made of the energy flow through the sample during the pulse and by means of a suitable indicator such as an oscilloscope determining the relationship of the applied pulse force and the pulse energy flow through the sample. This is accomplished by applying to the horizontal sweep system (superimposed on the regular horizontal time base) a portion of the energy pulse which appears across the sample, the horizontal sweep being synchronized to the pulse frequency. The pulse energy flow through the sample is obtained in the electrical case from the voltage developed across a measuring resistor. This voltage is then clipped so that the high peaks from the displacement current at the leading and trailing edges of the pulse will not not saturate the scope amplifier. The output of the clipper is then applied to the vertical deflection system of the oscilloscope in the usual manner for display of input signals. With the pulse voltage of the electrical case applied to the horizontal sweep system of the oscilloscope as well as to the sample, a peculiarly displaced form of individual presentation is obtained; however, since the horizontal deflection of the start of the sweep is proportional to the magnitude of the pulse voltage also at a selected time after the start of the pulse, it corresponds to the identical point on the pulse that causes the deflection in the current reading. This automatically eliminates the danger of error arising from not reading the voltage that directly corresponds to the current produced thereby. With the apparatus and technique established as in the foregoing, the pulse voltage is varied with a series of curves being made which can be recorded photographically in which a line will be traced out corresponding to the pulsed voltage-current characteristics of the sample at a selected time after the start of each pulse. The number of points obtainable in the line traced is equal to the repetition rate times the time employed or required to raise the pulse voltage, therefore enough points are generally obtained in a few seconds so that the locus of the trace forms a continuous line. This time is short enough to eliminate most of the errors arising from the longer term drifts in temperature, activity, and so forth previously mentioned. By simply changing the delay time, it is possible to select different points along the pulse for which the current-voltage characteristics might be desired.

With reference now to FIG. 1 of the drawing the apparatus shown therein contains a pulse generator 10, an amplitude control device 11 connected thereto by means of which selected amplitudes of the pulse output signal may be applied to two output lines, an oscilloscope 12 connected to one output of the amplitude control device 11, a sample 13 connected to one output of the amplitude control device 11, said sample being connected in series wtih a resistor 14 by means of which a voltage is produced proportional to the current passing through the sample, a clipper 16 connected across the current measuring resistor 14 and to the oscilloscope 12.

The connection of the amplitude control device 11 to the oscilloscope 12 is to the horizontal input of the scope where it is applied and mixed with the normal horizontal sweep signal forming the x time base thereof. The clipper 16 is connected to the normal Y or vertical input of the oscilloscope 12.

The duration of the pulse from pulser 10 is selected of any convenient duration; typically, however, it is one hundred microseconds, it being desired that the pulse be of a flat top variety so that there is no substantial voltage variation during the pulse itself. The wave form of FIGURE 3a shows in general the character of the current flow through the sample indicating, as a result of the voltage applied thereto, an initial spike portion corresponding to the displacement current. The amplitude control device 11 is of any suitable conventional nature; it may be simply a manually controlled potentiometer arrangement and including auxiliary amplifiers by means of which the amplitude of the output signals applied to the oscilloscope and to the sample may be varied as desired. The amplitude of the signal applied to the oscilloscope is selected to provide a convenient deflection. Typically the maximum horizontal deflection for a five inch scope would be in the order of 2 and ½ to 3 inches, while a vertical deflection of the order of 1 and ½ to 2 inches would be appropriate.

To eliminate undesired effects of the displacement current it is preferred that the oscilloscope 12 contain either within it or in the form of separate components, a delay device (described more fully in relation to FIG. 2) which delays the start of the main sweep of the oscilloscope 12 following the occurrence of the pulse delivered to the oscilloscope 12 from amplitude control 11. Thus the horizontal sweep of the oscilloscope 12 will not start until the passage of a period of time following the pulse so that the initial portion of the pulse is not present in the clipper output, being modified in such a way that the presentation of the Y signal on the oscilloscope is a short duration pulse of substantially rectangular characteristics shown by wave form 3c. The initial portion of the pulse thus occurs during flyback of the scope or otherwise in conventional manner occurring during non-intensified portions of the cathode ray tube presentation. The further application of the pulse from the amplitude control device 11 to the horizontal sweep system of the oscilloscope 12 results in a distortion of the pulse appearing on the scope 12 to where the rectangular pulse of FIGURE 3c is not actually viewed but rather a pulse displaced in portions thereof as shown by FIGURE 3d is obtained. The initial high amplitude portion of the pulse of the FIG. 3c is displaced to the right by the application of the pulse signal to the horizontal sweep system to where it appears to be displaced in terms of a quantity L which is proportional to the amplitude of the pulse applied to sample 13. Thus the indication of the oscilloscope 12 contains a vertical displacement proportional to the amount of current flowing through the sample, the voltage applied to the sample being indicated as a magnitude proportional to the magnitude of the quantity L of FIGURE 3d.

The result of this operation is that when the magnitude of the pulse output of the amplitude control device 11 is varied a series of distorted displaced pulses is obtained as shown in FIGURE 3e in which the leading edge of the pulse will appear along the locus of the line a–b which is exactly indicative of the voltage-current characteristics of the sample under test at the selected instant in time following the application of the pulse voltage. This device is capable of analyzing very short term equilibrium conditions in that by merely selecting the magnitude of T occasioned by the delay in the start of the horizontal sweep of the oscilloscope 12 it is possible to select the instant in time for each pulse following which the measurement is taken. It is thus possible to obtain for all pulses an indication of the current flowing through the circuit after the initial displacement current has subsided or even during it, if actually desired so that complete uniformity of operation is obtained.

With the pulser 10 operative at a fairly low rate, typically 60 cycles per second, it is possible to obtain a complete sweep of the line a–b of FIGURE 3b in a matter of a few seconds by varying the amplitude control device 11. This variation can be by hand manipulation of a potentiometer or by some mechanical or electrical device. With camera 17 then set up so as to photograph the presentation of the oscilloscope face, a very rapid and permanent record of the operation is obtained from which the characteristics of the sample may be determined.

FIGURE 2 shows the manner in which the variable amplitude output of amplitude control device 11 may be applied to the normal deflection circuit of a typical oscilloscope. In FIGURE 2, the output of the amplitude control 11 is connected to terminal 20 which, in turn, is connected through a typical 150K resistor 21 and a D.C. blocking capacitor 22 to the normal connection between the sweep generator 23 of the oscilloscope and the sweep amplifier 24 of the oscilloscope. Between the condensor 22 and the sweep generator 23 an isolating and voltage dividing resistance 25 is inserted to provide not only isolation but also to provide voltage divider action with resistance 21 whereby a selected portion of the output from amplitude control device 11 is effectively applied to sweep amplifier 24. Sweep amplifier 24 output is applied as normal via line 26 to the conventional deflection circuitry of the oscilloscope 12. In addition, a conventional horizontal positioning apparatus for the oscilloscope 12 is indicated by block 27. Synchronism of the sweep generator 23 to the frequency of pulser 10 is provided by connection of the input signal through delay device 28 to the synchronization or trigger portion of the sweep generator 23. Delay device 28 is made adjustable, preferably, to permit a control over the duration of the time delay of FIGURE 3b.

A large number of measurements made of the voltage current characteristics of ohmic samples have been made with a high degree of accuracy employing the apparatus described in the foregoing. It is evident, however, that the pulse measuring system is not restricted solely to applications involving conductivity type measurements, but rather can be used for any two interdependent pulsed functions or even two interdependent functions where only one is pulsed. An example of this latter case is a plot of pulsed current as a function of temperature for a given pulsed voltage. Here the D.C. output of a thermocouple can be amplified and inserted into the horizontal deflection system as a D.C voltage.

The specific application for which this pulse measuring system was evolved was to obtain very accurate thermionic emission characteristics of oxide cathodes in strong field regions. The normal D.C. methods for accurate measurements are not adequate for this case, since a *continuous* field acting on this semiconductor surface causes such unwanted effects as poisoning and donor migrations to take place. Furthermore, because of the introduction of errors outlined in the preceding discussion, the standard pulse measuring techniques of the prior art were incapable of providing the accuracy desired.

Obviously many modifications and variations of the present invention are possible in the light of the above teachings. It is therefore to be understood that within the scope of the appended claims the invention may be practiced otherwise than as specifically described.

What is claimed is:
1. Apparatus for measuring the characteristics of a sample of material comprising:
   means for applying a series of rectangular single polarity pulses of successively increasing amplitude to said sample of material for producing a current which passes through said sample,
   means for receiving said current after passing through said sample and for deriving an output proportional to the current flow through said sample which is responsive to the successively increasing pulses.
   display means having horizontal and vertical deflection means for signal presentation in two coordinates,
   means in said display means for producing a time base sweep signal synchronized with the successively increasing single polarity pulses,
   means for applying the output signal proportional to the current flow through said sample to said vertical deflection means of said display means, and
   means for applying the series of successively increasing rectangular single polarity pulses and the time base sweep signal to the horizontal deflection means of said display means.

2. Apparatus for measuring the characteristics of a sample of material as set forth in claim 1 wherein the means for producing a time base sweep signal and the means for applying the continuously increasing rectangular single polarity pulses and the time base sweep signal to the horizontal deflection means of said display means comprises:
   a sweep amplifier coupled to said horizontal deflection means,
   a sweep generator having a trigger input and an output, said output coupled to said sweep amplifier,
   delay means coupled between said sweep generator trigger input and said means for applying said single polarity pulses, and
   means for coupling said sweep generator output to said means for applying single polarity pulses to said sample.

References Cited by the Examiner
UNITED STATES PATENTS

| | | | |
|---|---|---|---|
| 2,371,636 | 3/1945 | McConnell | 324—65 X |
| 2,612,626 | 9/1952 | Miles | 324—26 |
| 2,616,058 | 10/1952 | Wagner | 324—26 X |
| 2,793,343 | 5/1957 | Wagner | 324—57 X |
| 2,882,486 | 4/1959 | Eberhardt | 324—26 |
| 2,900,582 | 8/1959 | Moll | 324—158 |
| 3,028,578 | 4/1962 | Stanton | 324—68 X |

OTHER REFERENCES

Spitzer et al., "Measurement of the Lifetime of Minority Carriers in Germanium," article in Journal of Applied Physics, vol. 26, No. 4, April 1955, pp. 414–417.

WALTER L. CARLSON, *Primary Examiner.*

FREDERICK M. STRADER, *Examiner.*

A. E. RICHMOND, *Assistant Examiner.*